United States Patent
Lee

(10) Patent No.: US 11,845,488 B2
(45) Date of Patent: Dec. 19, 2023

(54) STEERING CONTROL APPARATUS, METHOD THEREFOR AND STEERING SYSTEM

(71) Applicant: HL MANDO CORPORATION, Gyeonggi-do (KR)

(72) Inventor: Kwang Hyung Lee, Gwangju-si Gyeonggi-do (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 40 days.

(21) Appl. No.: 17/642,456

(22) PCT Filed: Sep. 3, 2020

(86) PCT No.: PCT/KR2020/011802
§ 371 (c)(1),
(2) Date: Mar. 11, 2022

(87) PCT Pub. No.: WO2021/049814
PCT Pub. Date: Mar. 18, 2021

(65) Prior Publication Data
US 2022/0315104 A1   Oct. 6, 2022

(30) Foreign Application Priority Data
Sep. 11, 2019 (KR) .......................... 10-2019-0112571

(51) Int. Cl.
*B62D 15/02* (2006.01)

(52) U.S. Cl.
CPC .................................. *B62D 15/025* (2013.01)

(58) Field of Classification Search
CPC .... B62D 6/003; B62D 15/025; B62D 5/0463; B62D 5/04; B62D 6/00; B62D 6/002;
(Continued)

(56) References Cited

U.S. PATENT DOCUMENTS 2,022,987 A * 12/1935 Sustersic .................. B62D 7/14
180/401
4,918,744 A *  4/1990 Shimizu ............... B62D 5/0463
318/646
(Continued)

FOREIGN PATENT DOCUMENTS

AU    2016349921 A1 *  5/2018  ............. A01D 34/64
CA       3003743 C  * 12/2019  ............. A01D 34/64
(Continued)

OTHER PUBLICATIONS

"Driver-vehicle closed-loop simulation of differential drive assist steering control system for motorized-wheel electric vehicle," Wang et al.; 2009 IEEE Vehicle Power and Propulsion Conference (pp. 564-571), Sep. 1, 2009. (Year: 2009).*
(Continued)

*Primary Examiner* — Khoi H Tran
*Assistant Examiner* — Jorge O Peche
(74) *Attorney, Agent, or Firm* — Hauptman Ham, LLP

(57) ABSTRACT

The present disclosure provides a steering control apparatus, a method therefor and a steering system, wherein, when a vehicle slips, the steering control apparatus increases traction by steering a road wheel to the left and right along a current steering direction. Particularly, the steering control apparatus comprises: a slip occurrence determination unit for determining whether or not the vehicle has slipped; a steering angle determination unit for, when it is determined that the vehicle has slipped, determining a current steering angle of a steering wheel as a reference steering angle; and a control unit for controlling a driving shaft so that the road wheel may be steered to the left and right within a first angle range on the basis of the reference steering angle.

13 Claims, 13 Drawing Sheets

(58) Field of Classification Search
CPC .............. B62D 15/02; B60W 2520/20; B60W 2552/15; B60W 10/20; B60W 40/103; B60W 40/105; B60W 2520/26
See application file for complete search history.

(56) References Cited

U.S. PATENT DOCUMENTS

| | | | | |
|---|---|---|---|---|
| 5,251,135 | A * | 10/1993 | Serizawa | B62D 6/003 180/402 |
| 5,423,391 | A * | 6/1995 | Shimizu | B62D 7/08 701/42 |
| 5,519,614 | A * | 5/1996 | Miichi | B62D 6/00 701/44 |
| 5,631,833 | A * | 5/1997 | Wada | B62D 5/0463 701/42 |
| 5,904,223 | A * | 5/1999 | Shimizu | B62D 5/0463 180/443 |
| 5,907,277 | A * | 5/1999 | Tokunaga | B62D 6/008 318/489 |
| 5,996,724 | A * | 12/1999 | Shimizu | B62D 6/00 701/41 |
| 6,008,599 | A * | 12/1999 | Beck | B62D 5/0463 318/400.29 |
| 8,255,119 | B2 * | 8/2012 | Komori | B60T 8/174 701/72 |
| 9,592,848 | B1 * | 3/2017 | Hirate | B62D 6/008 |
| 10,017,215 | B2 * | 7/2018 | Auden | B62D 37/02 |
| 2002/0035425 | A1 * | 3/2002 | Deguchi | B62D 7/159 180/443 |
| 2003/0051560 | A1 * | 3/2003 | Ono | B62D 15/02 73/862.08 |
| 2004/0016294 | A1 * | 1/2004 | Sugitani | B60T 8/172 73/146 |
| 2004/0036601 | A1 * | 2/2004 | Obradovich | B60W 30/18 340/425.5 |
| 2004/0238265 | A1 * | 12/2004 | Tsuchiya | B62D 5/0463 180/446 |
| 2005/0067213 | A1 * | 3/2005 | Yasui | B60G 21/0555 180/443 |
| 2005/0125153 | A1 * | 6/2005 | Matsumoto | B60T 8/17557 701/41 |
| 2005/0209751 | A1 * | 9/2005 | Kato | B62D 6/003 701/41 |
| 2005/0224277 | A1 * | 10/2005 | Kato | B62D 6/04 701/41 |
| 2006/0069481 | A1 * | 3/2006 | Kubota | B62D 5/0463 701/41 |
| 2007/0039775 | A1 * | 2/2007 | Matsuno | B62D 5/008 180/446 |
| 2007/0265750 | A1 * | 11/2007 | Goto | B62D 6/003 701/41 |
| 2008/0119984 | A1 * | 5/2008 | Hrovat | B62D 9/00 701/41 |
| 2008/0174415 | A1 * | 7/2008 | Tanida | B62D 1/046 340/438 |
| 2008/0228354 | A1 * | 9/2008 | Kimura | B62D 5/0463 701/42 |
| 2008/0243339 | A1 * | 10/2008 | Nishimori | B60G 7/003 701/41 |
| 2009/0143941 | A1 * | 6/2009 | Tarasinski | A01D 41/127 701/41 |
| 2010/0077847 | A1 * | 4/2010 | Joe | G01M 17/02 73/146 |
| 2010/0108432 | A1 * | 5/2010 | Okazaki | B62D 5/0463 180/446 |
| 2010/0114449 | A1 * | 5/2010 | Shiozawa | B62D 6/005 701/90 |
| 2010/0222959 | A1 * | 9/2010 | Murata | B60W 10/22 701/31.4 |
| 2010/0222960 | A1 * | 9/2010 | Oida | B60W 10/22 701/31.4 |
| 2010/0235052 | A1 * | 9/2010 | Shartle | B62D 15/0245 701/41 |
| 2012/0046806 | A1 * | 2/2012 | Yokota | B62D 6/003 701/1 |
| 2012/0296525 | A1 * | 11/2012 | Endo | B62D 5/0466 701/42 |
| 2013/0226410 | A1 * | 8/2013 | Narita | B60W 10/184 701/41 |
| 2013/0253770 | A1 * | 9/2013 | Nishikawa | B60W 10/18 701/1 |
| 2013/0261898 | A1 * | 10/2013 | Fujita | B62D 6/003 701/42 |
| 2014/0008141 | A1 * | 1/2014 | Kageyama | B60G 3/20 180/400 |
| 2014/0019008 | A1 * | 1/2014 | Nakamura | B62D 6/008 701/42 |
| 2014/0371992 | A1 * | 12/2014 | Di Cairano | B62D 5/0463 701/41 |
| 2015/0203116 | A1 * | 7/2015 | Fairgrieve | B60T 8/175 701/93 |
| 2015/0291210 | A1 * | 10/2015 | Kageyama | B62D 5/04 701/41 |
| 2015/0314803 | A1 * | 11/2015 | Kojo | B60T 8/1755 701/43 |
| 2015/0329141 | A1 * | 11/2015 | Preijert | B62D 6/008 701/41 |
| 2016/0039416 | A1 * | 2/2016 | Shimokawa | B60W 10/188 701/36 |
| 2016/0046287 | A1 * | 2/2016 | Owen | B60W 10/04 701/43 |
| 2016/0046321 | A1 * | 2/2016 | Takashima | B62D 7/159 701/41 |
| 2016/0194001 | A1 * | 7/2016 | Kelly | B60K 28/165 701/41 |
| 2016/0362130 | A1 * | 12/2016 | Hwa | B62D 5/0421 |
| 2017/0120922 | A1 * | 5/2017 | Schaedler | B62D 11/04 |
| 2018/0009473 | A1 * | 1/2018 | Akatsuka | B62D 15/025 |
| 2018/0009474 | A1 * | 1/2018 | Akatsuka | B62D 15/025 |
| 2018/0086369 | A1 * | 3/2018 | Yanagi | B62D 5/0463 |
| 2018/0251151 | A1 * | 9/2018 | Kimura | B60W 40/114 |
| 2018/0257644 | A1 * | 9/2018 | Morotomi | G01S 13/931 |
| 2018/0326979 | A1 * | 11/2018 | Tsuruoka | B60W 30/0956 |
| 2019/0047616 | A1 * | 2/2019 | Lesbirel | B62D 6/006 |
| 2019/0054916 | A1 * | 2/2019 | Akiyama | B60T 8/00 |
| 2020/0156639 | A1 * | 5/2020 | Liu | B60W 40/105 |
| 2020/0156701 | A1 * | 5/2020 | Yamamoto | B62D 6/008 |
| 2020/0156704 | A1 * | 5/2020 | Albrecht | B62D 5/0457 |
| 2020/0217405 | A1 * | 7/2020 | Dumas | F16H 48/08 |
| 2021/0016825 | A1 * | 1/2021 | Miura | B62D 6/003 |
| 2022/0315104 | A1 * | 10/2022 | Lee | B60W 10/20 |

FOREIGN PATENT DOCUMENTS

| | | | | |
|---|---|---|---|---|
| CN | 102438880 | A * | 5/2012 | ............ B62D 15/025 |
| CN | 108025743 | A * | 5/2018 | ............ B60W 30/02 |
| DE | 4142055 | A1 * | 7/1992 | |
| EP | 1275937 | A2 * | 1/2003 | ............ B62D 15/02 |
| EP | 1518721 | A1 * | 3/2005 | ........ B60G 17/0195 |
| EP | 1584540 | A2 * | 10/2005 | ............ B60W 10/10 |
| EP | 3371036 | B1 * | 3/2020 | ............ A01D 34/64 |
| GB | 2516933 | A * | 2/2015 | ............ B60K 17/348 |
| JP | H06-298112 | A | 10/1994 | |
| JP | 2765076 | B2 * | 6/1998 | |
| JP | 3182972 | B2 * | 7/2001 | |
| JP | 2018-144646 | A | 9/2018 | |
| KR | 20-0317034 | Y1 | 10/2003 | |
| KR | 10-2009-0103283 | A | 10/2009 | |
| KR | 2009103283 | A * | 10/2009 | |
| KR | 20090103283 | A * | 10/2009 | |
| KR | 20160136932 | A * | 11/2016 | |
| KR | 2111319 | B1 * | 6/2020 | ............ B60W 10/20 |
| KR | 20210031075 | A * | 3/2021 | |
| WO | WO-0225291 | A2 * | 3/2002 | ............ B60C 23/04 |
| WO | WO-2014146806 | A1 * | 9/2014 | ............ B60W 10/04 |
| WO | WO-2017079370 | A1 * | 5/2017 | ............ A01D 34/64 |

(56) References Cited

FOREIGN PATENT DOCUMENTS

| WO | WO-2020122555 A1 | * | 6/2020 | ............ | B60W 10/20 |
| WO | WO-2021049814 A1 | * | 3/2021 | ............ | B60W 10/20 |

OTHER PUBLICATIONS

"Modeling and simulation studies on differential drive assisted steering for EV with four-wheel-independent-drive;" Wang et al.; 2008 IEEE Vehicle Power and Propulsion Conference (pp. 1-7); Feb. 9, 2009. (Year: 2009).*

"Simulation of Driving Force Power Steering Control System Based on AMESim and Simulink;" Jin et al., 2010 International Conference on Intelligent Computation Technology and Automation (vol. 3, pp. 329-332); Sep. 3, 2010. (Year: 2010).*

International Search Report dated Nov. 27, 2020, corresponding to International Application No. PCT/KR2020/011802.

* cited by examiner

STEERING CONTROL APPARATUS, METHOD THEREFOR AND STEERING SYSTEM

CROSS-REFERENCE TO RELATED APPLICATION

This application is a national phase of PCT/KR2020/011802 filed on Sep. 3, 2020, which is based on and claims priority to Korean Patent Application No. 10-2019-0112571 filed on Sep. 11, 2019, the disclosures of which are incorporated by reference herein in their entireties.

TECHNICAL FIELD

The disclosure relates to a steering control device and method, and a steering system, and a steering control device and method, and a steering system to increase traction by steering the road wheels to the left or right along the current steering direction when the vehicle slips.

BACKGROUND ART

When the vehicle travels on a road surface with reduced friction, such as on a rainy road, snowy road, or when sand exists on the road surface, the vehicle may slip, making it difficult to drive the vehicle as intended by the driver or autonomous driving device. If such slip occurs, the driver may lose control of the vehicle, even with a gentle slope or minor protrusions.

In particular, 2WD vehicles which drive only either the front-wheel axle or rear-wheel axle are vulnerable to low friction roads, such as rainy or snow roads. Only some vehicles capable of turning to 4WD may escape from such a slip, and accordingly, a need exists for a method for increasing traction to be commonly used for various types of vehicles, such as of FF, FR, and 4WD.

DETAILED DESCRIPTION OF THE INVENTION

Technical Problem

In this background, the disclosure proposes a scheme for increasing traction, which may be commonly used for various types of vehicles, such as of FF, FR, and 4WD.

Technical Solution

In an aspect of the disclosure conceived in light of the foregoing objectives, there is provided a steering control device comprising a slip determination unit determining whether a vehicle slips, a steering angle determination unit determining a current steering angle of a steering wheel as a reference steering angle if the vehicle is determined to slip, and a controller controlling a driving shaft to allow a road wheel to steer left or right within a first angular range with respect to the reference steering angle.

In another aspect of the disclosure, there is provided a steering control method comprising a slip determination step determining whether a vehicle slips, a steering angle determination step determining a current steering angle of a steering wheel as a reference steering angle if the vehicle is determined to slip, and a control step controlling a driving shaft to allow a road wheel to steer left or right within a first angular range with respect to the reference steering angle.

In still another aspect of the disclosure, there is provided a steering system comprising an input device detecting a steering angle of a steering wheel of a vehicle, an output device driving a road wheel of the vehicle, and a controller determining whether the vehicle slips and, if the vehicle is determined to slip, determining a current steering angle of the steering wheel as a reference steering angle and controlling a driving shaft to allow the road wheel to steer left or right within a first angular range with respect to the reference steering angle.

Advantageous Effects

As described above, according to the disclosure, when the vehicle slips, the driving shaft is controlled to allow the road wheels to be steered left or right with respect to the current steering angle of the steering wheel, thereby increasing traction on the low friction road surface, such as a rainy or snowy road, and hence providing stable driving.

MODE FOR CARRYING OUT THE INVENTION

Hereinafter, embodiments of the disclosure are described in detail with reference to the accompanying drawings. Terms, such as "first", "second", "A", "B", "(A)", or "(B)"

may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

In the disclosure, 'vehicle' may be a concept encompassing automobiles and motorcycles. Further, vehicle may be a concept encompassing all of internal combustion engine vehicles having an engine as a power source, hybrid vehicles having an engine and an electric motor as power sources, and electric vehicles having an electric motor as a power source. The following description focuses primarily on a car. In the following description, forward means a forward driving direction of the vehicle, and rearward means a rearward driving direction of the vehicle.

Figure 1:
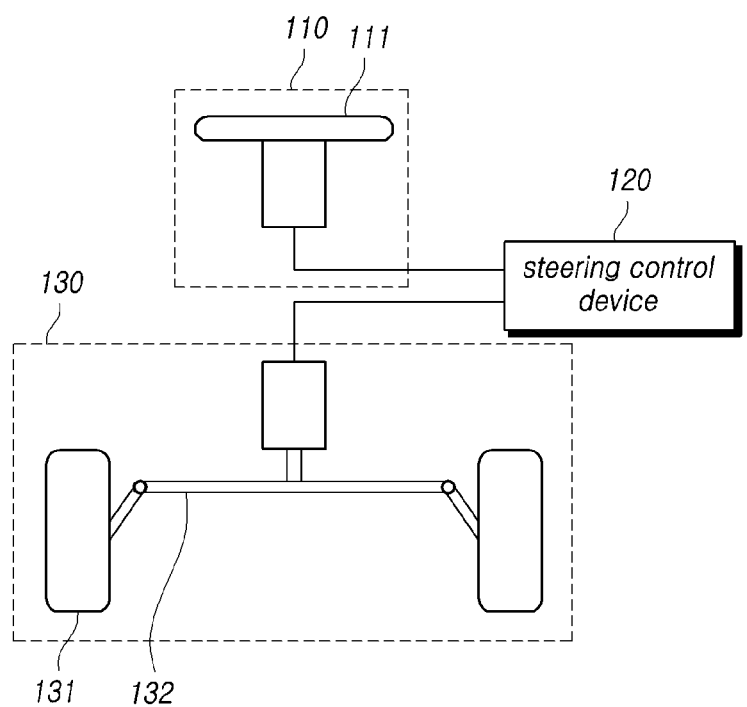
FIG. 1 is a view illustrating a configuration of a vehicle according to an embodiment of the disclosure.

FIG. 1 is a view illustrating a configuration of a vehicle according to an embodiment of the disclosure. The vehicle of the disclosure may have a steer-by-wire (SBW) system. Hereinafter, an example in which the steering control device of the disclosure is applied to an SBW system is described. However, vehicles to which the steering control device of the disclosure is applied are not limited to vehicles with an SBW system but may also be applied to vehicles in which a steering column device and a steering rack device are mechanically connected.

Steer-by-wire (SBW) system refers to a device that detects the manipulation of the steering wheel by the driver and generates a signal or receives a signal from an autonomous driving device or system and controls the steering of the road wheels using the signal, instead of a mechanical structure of connecting the steering wheel and the road wheels.

In electric power steering, the steering wheel, column, intermediate shaft (IMS) for steering device, rack, and road wheel are mechanically connected so that the road wheels or rack and the steering wheel always remain neutral. In other words, the road wheel or rack and the steering wheel are physically connected and they always are synchronized with each other.

In contrast, in the SBW system, an input side (steering column device) including the steering wheel and column and an output side (steering rack device) including the road wheel and rack are not physically connected and are controlled based on signals generated by the electronic control unit.

Referring to FIG. 1, a vehicle of the disclosure includes a steering column device 110 receiving a steering control signal for the vehicle from a driver of the vehicle, an autonomous driving device or system, a steering control device 120 generating a steering control signal for a steering rack device 130 using information input from the steering column device 110, and the steering rack device 130 controlling a road wheel 131 of the vehicle according to the steering control signal.

Specifically, the steering column device 110 may include the steering wheel 111, a steering shaft, a steering angle sensor detecting the steering angle of the steering wheel, a torque sensor detecting the torque of the steering wheel steering shaft, and a reaction force motor providing reaction force torque according to the rotation of the steering wheel.

The steering rack device 130 may include the road wheel 131, a driving shaft 132, a steering output sensor capable of detecting the rotation angle of the road wheel, a steering motor generating an assistance force to allow the road wheel to rotate, a steering motor position sensor detecting the position of the rotation shaft of the steering motor, and a rack position sensor detecting the position of the rack. Further, the steering control device may be a domain control unit (DCU) that controls a series of driver assist systems or autonomous driving devices or systems, as well as the electronic control unit (ECU) or steering controls.

If the driver turns the steering wheel, the torque of the torsion bar and the amount of rotation of the steering wheel determined by the autonomous driving device or system or detected by the steering angle sensor and torque sensor are transferred to the steering control device, and the steering control device generates and provides a current for steering control of the road wheel to the steering motor, thereby steering the road wheel.

Figure 2:
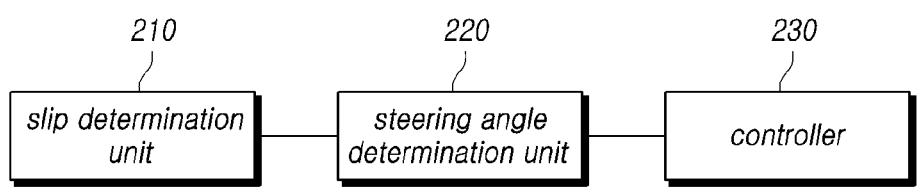
FIG. 2 is a view illustrating a configuration of a steering control device according to an embodiment of the disclosure.

FIG. 2 is a view illustrating a configuration of a steering control device 200 according to an embodiment of the disclosure.

Referring to FIG. 2, the steering control device 200 of the disclosure may include a slip determination unit 210 determining whether the vehicle slips, a steering angle determination unit 220 determining the current steering angle of the steering wheel as a reference steering angle if the vehicle is determined to slip, and a controller 230 controlling the driving shaft to steer the road wheel to the left or right within a first angular range with respect to the reference steering angle.

The slip determination unit 210 of the disclosure may determine whether the vehicle slips. In an embodiment, the slip determination unit 210 may determine whether the vehicle slips, using at least one of whether the driving shaft of the vehicle slips, vehicle velocity information about the vehicle, and information about the slope of the road where the vehicle is traveling. The slip determination unit 210 may determine whether the vehicle slips, according to any one of whether the driving shaft of the vehicle slips, the vehicle velocity information, and the slope information about the road where the vehicle is traveling, or the slip determination unit 210 may determine a plurality of information among whether the vehicle slips, according to any one of whether the driving shaft of the vehicle slips, the vehicle velocity information, and the slope information about the road where the vehicle is traveling, in a predetermined order to thereby determine whether the vehicle slips.

In an embodiment, the slip determination unit 210 may determine whether the driving shaft of the vehicle slips and, if the driving shaft is determined to slip, detect the slope of the vehicle-traveling road, determine whether the slope of the vehicle-traveling road is larger than a first slope threshold, if the first slope of the vehicle-traveling road is determined to be the first slope threshold, determine whether the vehicle velocity is smaller than a first vehicle velocity threshold, and if the vehicle velocity is determined to be smaller than the first vehicle velocity threshold, determine that the vehicle slips.

Here, the slope of the vehicle-traveling road may be detected using, e.g., a slope sensor mounted to the vehicle. Or, the vehicle may obtain map information through, e.g., navigation and extract information about the road where the vehicle is positioned from the map information, using the vehicle position information. In an embodiment, the vehicle velocity may be detected using a vehicle velocity sensor mounted to the vehicle. In another embodiment, the vehicle velocity may be received from another ECU or from an external device or infrastructure outside the vehicle through a communication unit, e.g., a V2X communication unit. The V2X communication unit performs wireless communication with a server or another vehicle or infrastructure device. In the instant embodiment, the V2X communication unit means that the vehicle exchanges information with a thing, such as another vehicle, mobile device, or road, through a wired/wireless network, or a technique therefor. The V2X communication unit may include the concepts of vehicle-to-vehicle (V2V), vehicle-to-infrastructure (V2I), vehicle-to-nomadic device (V2N), and vehicle-to-pedestrian (V2P) communication. The V2X communication unit may be based on dedicated short-range communications (DSRC) and may use wireless access in vehicular environment (WAVE) of the American Institute of Electrical and Electronic Engineers (IEEE) or IEEE 802.11p communication technology using a 5.9 GHz band, but is not limited thereto, it should be appreciated as including all inter-vehicle communications currently developed or to be developed in the future.

In an example, the slip determination unit 210 may determine whether a slip occurs in the driving shaft of the vehicle using the vehicle velocity information, information about the RPM of the road wheel detected from the road-wheel brake shaft, and information detected by the vehicle inertia sensor.

In an example, the first slope threshold may be 10 degrees, and if the slope of the vehicle-traveling road is larger than 10 degrees, the slip determination unit 210 may determine that a slip occurs in the driving shaft of the vehicle. The first slope threshold information may be previously stored in the vehicle.

In an example, the first vehicle velocity threshold may be 20 km/h, and if the vehicle traveling velocity is smaller than 20 km/h, the slip determination unit 210 may determine that a slip occurs in the driving shaft of the vehicle. The first vehicle velocity threshold information may be previously stored in the vehicle.

The steering angle determination unit 220 of the disclosure may determine the current steering angle of the steering wheel as a reference steering angle when the vehicle is determined to slip. The controller 230 may control the driving shaft to allow the road wheel to steer left or right within a first angular range with respect to the reference steering angle.

Figure 3:
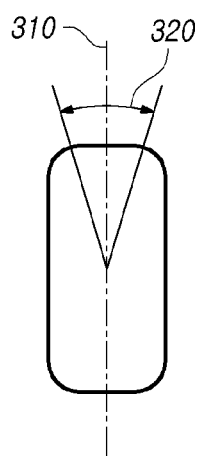
FIG. 3 is a view illustrating an embodiment in which a steering control device of the disclosure steers road wheels to the left or right.

FIG. 3 is a view illustrating an embodiment in which a steering control device of the disclosure steers road wheels to the left or right. Referring to FIG. 3, if the vehicle is determined to slip, the steering angle determination unit 220 may obtain current steering angle information from the steering wheel or the steering controller controlling the steering wheel and determine the current steering angle of the steering wheel or the steering controller as the reference steering angle. Thereafter, the controller 230 may control the driving shaft to allow the road wheel to steer left or right with respect to the reference steering angle.

In other words, the controller 230 may determine the current steering angle of the steering wheel as the driving direction and allow the road wheel to steer left or right with respect to the driving direction corresponding to the current steering angle, i.e., a reference steering axis 310. Here, the reference steering axis 310 corresponds to the reference steering angle determined by the steering angle determination unit. The controller 230 may control the driving shaft to allow the road wheel to steer left or right within a first angular range 320 with respect to the reference steering axis 310.

In an embodiment, the first angular range 320 may be determined based on at least one of the physical information about the vehicle, vehicle velocity information, and information about the slope of the vehicle-traveling road. Here, the vehicle physical information may include such information as the length, width, and driving type (e.g., FF, FR, or 4WD) of the vehicle. Or, the first angular range 320 may be determined by a design value. In an example, the first angular range may be five degrees.

In an embodiment, the controller 230 may control the driving shaft to allow the road wheel to steer left or right within a first angular range at a first frequency with respect to the reference steering angle. The first frequency denotes the velocity at which the controller steers the road wheel to the left or right. The first frequency may be set to a pre-stored value or may be determined according to a pre-stored frequency pattern.

The pre-stored frequency pattern may include at least one information of the physical information about the vehicle, vehicle velocity information, and information about the slope of the vehicle-traveling road. The controller 230 may determine that the frequency value corresponding to at least one of physical information, vehicle velocity information, and information about the slope of the vehicle-traveling road in the pre-stored frequency pattern, as the first frequency and steer the road wheel at the corresponding frequency.

In an embodiment, if the controller 230 controls the driving shaft to allow the road wheel to steer left or right within the first angular range 320 with respect to the reference steering angle, the controller 230 may control to allow steering state information about the road wheel not to be fed back to the steering wheel.

Since, in the SBW system, an input side (steering column device) including the steering wheel and column and an output side (steering rack device) including the road wheel and rack are not physically connected and are controlled based on signals generated by the electronic control unit, the controller 230 may transfer different control signals to the input side and the output side. Accordingly, the controller 230 may control the driving shaft to steer the road wheel while controlling to allow the steering control information about the road wheel not to be fed back to the steering wheel.

Figure 4:
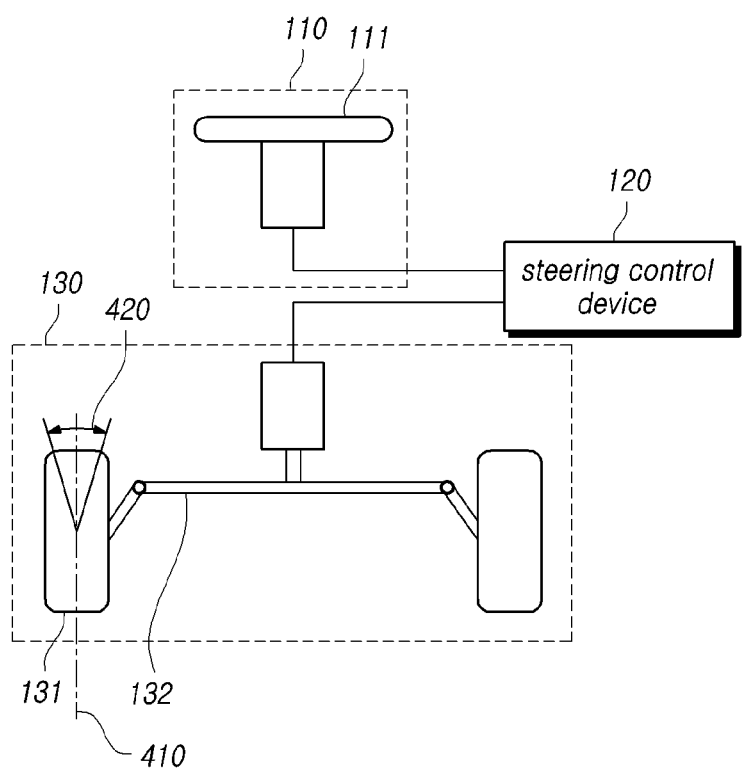
FIG. 4 is a view illustrating an embodiment of stopping feedback to a steering wheel when a steering control device of the disclosure steers road wheels to the left or right.

FIG. 4 is a view illustrating an embodiment of stopping feedback to a steering wheel 111 when a steering control device 120 of the disclosure steers road wheels 131 to the left or right.

Referring to FIG. 4, the steering control device 120 controls the driving shaft 132 to allow the road wheel 131 to steer left or right within a first angular range 420 with respect to a reference steering angle 410 determined by the steering angle determination unit 220. In this case, the steering control device 120 transmits no control signal for providing steering force to the steering wheel 111 while steering the road wheel 131. Accordingly, since no steering force is provided to the steering wheel 111, no change occurs in the steering wheel 111.

Accordingly, since the steering wheel is not moved even when the steering control device 120 of the disclosure steers the road wheel to the left or right to increase traction, it is possible to increase driving stability without causing the driver or passenger to feel odd.

In an embodiment, road wheels include front road wheels and rear road wheels. The controller 230 may control the driving shaft to allow the front road wheels to steer left or right within a second angular range with respect to the reference steering angle 410 and to allow the rear road wheels to steer left or right within a third angular range with respect to the reference steering angle 410. In other words, the controller 230 may control the front road wheels and the rear road wheels with different setting values.

Figure 5:
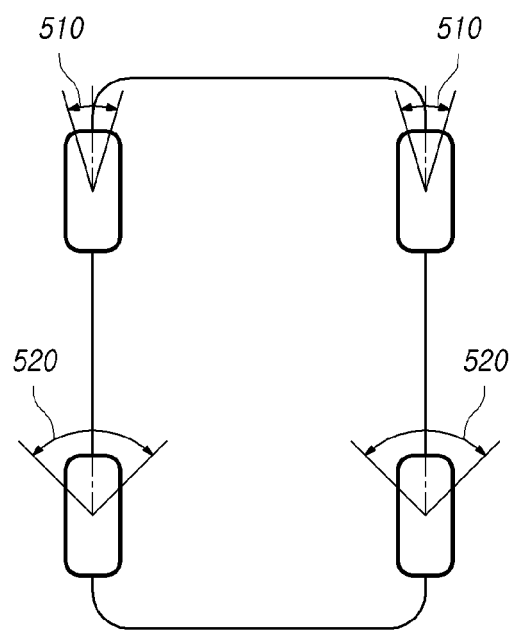
FIG. 5 is a view illustrating an embodiment in which a steering control device of the disclosure steers front road wheels and rear road wheels to the left or right using different setting values.

FIG. 5 is a view illustrating an embodiment in which a steering control device 200 of the disclosure steers front road wheels and rear road wheels to the left or right using different setting values. Referring to FIG. 5, the controller 230 may control the driving shaft to allow the front road wheel to steer left or right within a second angular range 510 with respect to the reference steering angle. Simultaneously, the controller 230 may control the driving shaft to allow the rear road wheel to steer left or right within a third angular range 520 with respect to the reference steering angle. Here, the second angular range 510 may be set to be smaller than the third angular range 520. As an example, the ratio of the second angular range 510 to the third angular range 520 may be preset, and the controller 230 may determine the second angular range 510 and the third angular range 520 according to the preset ratio.

Figure 6:
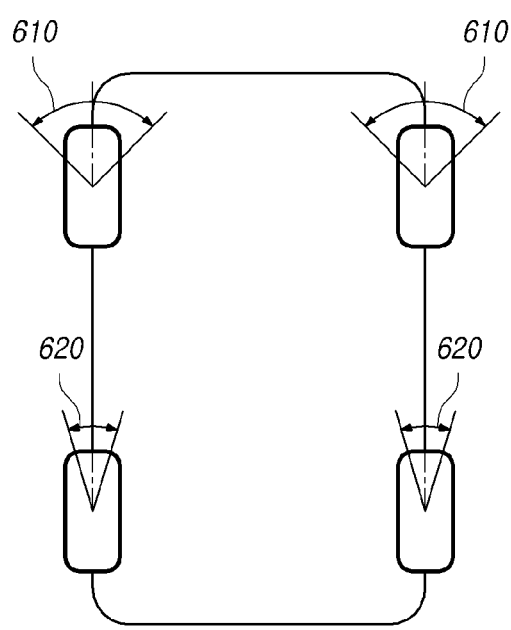
FIG. 6 is a view illustrating another embodiment in which a steering control device of the disclosure steers front road wheels and rear road wheels to the left or right using different setting values.

FIG. 6 is a view illustrating another embodiment in which a steering control device 200 of the disclosure steers front road wheels and rear road wheels to the left or right using different setting values. Likewise, the controller 230 may steer the front road wheel and the rear road wheel within a second angular range 610 and a third angular range 620, respectively, with respect to the reference steering angle. In FIG. 6, the third angular range 620 may be set to be smaller than the second angular range 610.

As such, the steering control device 200 may steer the front road wheel and the rear road wheel of the vehicle in different ranges, thus efficiently increasing traction.

In an embodiment, the steering angle determination unit 220 determines whether the steering angle of the steering wheel is identical to the reference steering angle. If the steering angle of the steering wheel is determined not to be identical to the reference steering angle, the controller 230 may stop controlling the driving shaft to allow the road wheel to steer left or right within the first angular range and may control to allow the driving shaft to follow the steering angle of the steering wheel.

The steering angle determination unit 220 may obtain the steering angle information about the steering wheel from a steering angle sensor, in real-time or periodically. The steering angle determination unit 220 may determine that the vehicle slips and determine that the steering angle information about the steering wheel when the vehicle slips is the reference steering angle, and then, obtain steering angle information about the steering wheel from the steering angle sensor and determine whether the obtained steering angle information about the steering wheel is identical to the reference steering angle. That the steering angle of the steering wheel is determined not to be identical to the reference steering angle means that the driver has manipulated the steering wheel or the autonomous driving device or system has controlled steering. Thus, it may be determined that the driver or autonomous driving device or system has an intent to steer. Accordingly, if the steering angle of the steering wheel is determined not to be identical to the reference steering angle, the controller 230 may stop controlling the driving shaft to allow the road wheel to steer left or right within the first angular range and may control to allow the driving shaft to follow the steering angle of the steering wheel.

In an embodiment, if the steering angle determination unit 220 determines that the steering angle of the steering wheel is varied by a predetermined range or more, the controller 230 may stop controlling the driving shaft to allow the road wheel to steer left or right within the first angular range and may control to allow the driving shaft to follow the steering angle of the steering wheel.

Figure 7:
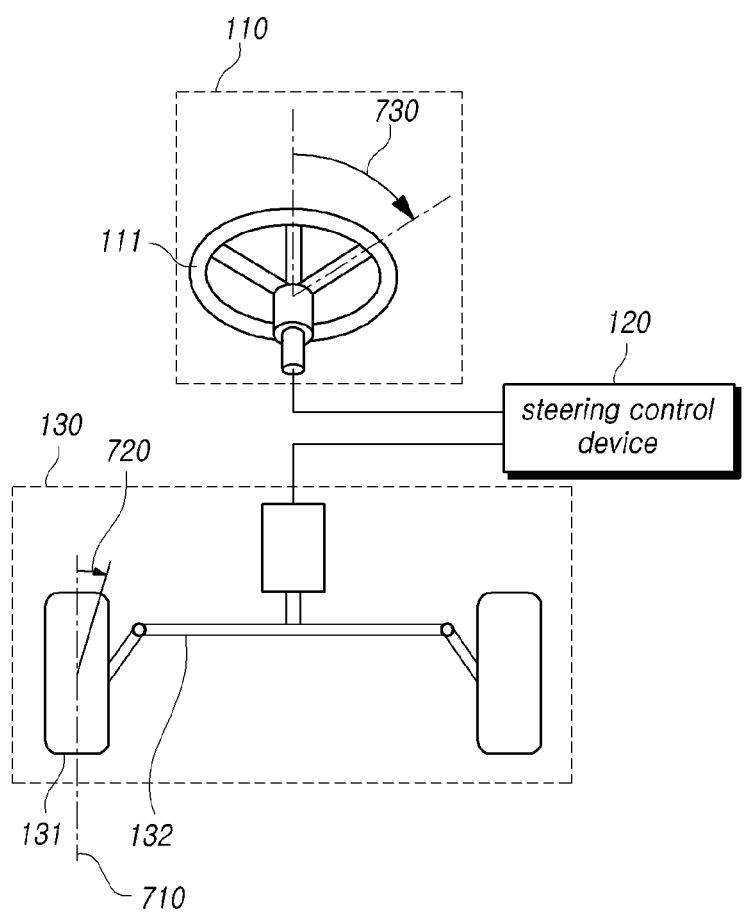
FIG. 7 is a view illustrating an embodiment in which a steering control device of the disclosure allows road wheels to follow steering of a steering wheel when the rotation angle of the steering wheel is changed.

FIG. 7 is a view illustrating an embodiment in which a steering control device 120 of the disclosure allows road wheels to follow steering of a steering wheel when the rotation angle of the steering wheel is changed.

Referring to FIG. 7, if the steering angle determination unit 220 determines that the steering wheel 111 is rotated by a predetermined range 730 or more, i.e., if the steering angle of the steering wheel 111 is determined to be varied by a predetermined threshold angle or more, the steering angle determination unit 220 may determine that the steering angle of the steering wheel 111 is not identical to a reference steering angle 710. If the steering angle of the steering wheel 111 is determined not to be identical to the reference steering angle, the controller stops controlling the driving shaft 132 to allow the road wheel 131 to steer left or right within the first angular range with respect to the reference steering angle. Further, the controller 230 may output a control signal for steering the road wheel 131 to allow the road wheel 131 to correspond to a range 720 according to the steering angle of the steering wheel 111.

By the steering control device 120 of the disclosure, when the vehicle slips, the driving shaft is controlled to allow the road wheels to be steered left or right with respect to the current steering angle of the steering wheel, thereby increasing traction on the low friction road surface, such as a rainy or snowy road, and hence providing stable driving.

Figure 8:
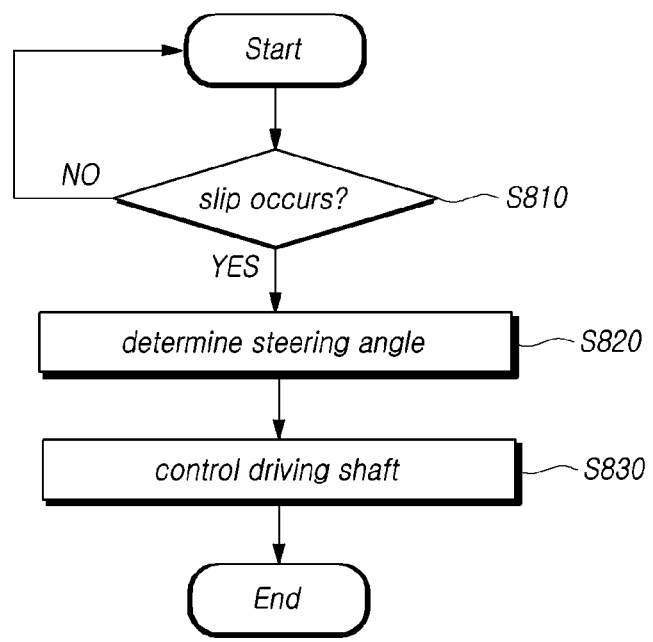
FIG. 8 is a flowchart illustrating a steering control method according to an embodiment of the disclosure.

FIG. 8 is a flowchart illustrating a steering control method according to an embodiment of the disclosure.

Referring to FIG. 8, a steering control method of the disclosure may include a slip determination step S810 determining whether the vehicle slips, a steering angle determination step S820 determining the current steering angle of the steering wheel as a reference steering angle if the vehicle is determined to slip, and a control step S830 controlling the driving shaft to steer the road wheel to the left or right within a first angular range with respect to the reference steering angle.

Figure 9:
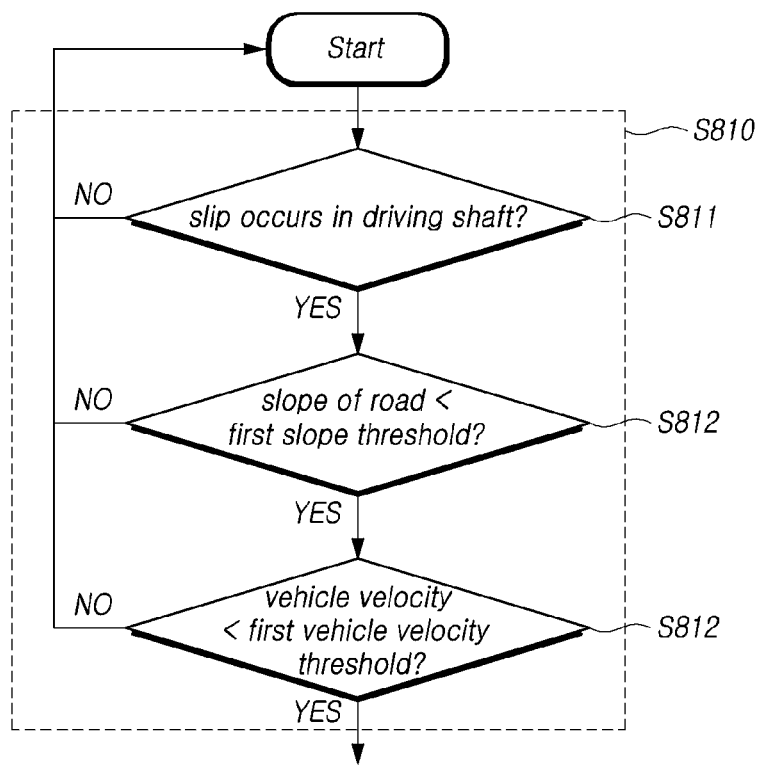
FIG. 9 is a flowchart illustrating an embodiment of determining a slip of a vehicle in a steering control method of the disclosure.

First, the steering control device 200 using the steering control method of the disclosure may determine whether the vehicle slips. FIG. 9 is a flowchart illustrating an embodiment of determining a slip of a vehicle in a steering control method of the disclosure.

In the slip determination step S810 of an embodiment, the steering control device 200 may determine whether the vehicle slips, using at least one of whether the driving shaft of the vehicle slips, vehicle velocity information about the vehicle, and information about the slope of the road where the vehicle is traveling. The steering control device 200 may determine whether the vehicle slips, by determining, in a predetermined order, a plurality of information among whether the driving shaft of the vehicle slips, the vehicle velocity information, and the slope information about the road where the vehicle is traveling. Or, the steering control device 200 may determine whether the vehicle slips, according to any one of whether the driving shaft of the vehicle slips, vehicle velocity information about the vehicle, and information about the slope of the road where the vehicle is traveling.

In an embodiment, the steering control device 200 may determine whether the driving shaft of the vehicle slips and, if the driving shaft is determined to slip, detect the slope of the vehicle-traveling road, determine whether the slope of the vehicle-traveling road is larger than a first slope threshold, if the first slope of the vehicle-traveling road is determined to be the first slope threshold, determine whether the vehicle velocity is smaller than a first vehicle velocity threshold, and if the vehicle velocity is determined to be smaller than the first vehicle velocity threshold, determine that the vehicle slips.

Here, the slope of the vehicle-traveling road may be detected using, e.g., a slope sensor mounted to the vehicle. Or, the vehicle may obtain map information through, e.g., navigation and extract information about the road where the vehicle is positioned from the map information, using the vehicle position information. In an embodiment, the vehicle velocity may be detected using a vehicle velocity sensor mounted to the vehicle. In another embodiment, the vehicle velocity may be received through another ECU or from an external device or infrastructure outside the vehicle through a communication unit, e.g., a V2X communication unit. The V2X communication unit is a component that performs wireless communication with, e.g., a server or another vehicle or an infrastructure device, and its specific functions or implementation scheme may reference what has been described in connection with the steering control device of FIG. 2.

In an example, the steering control device 200 may determine whether a slip occurs in the driving shaft of the vehicle using the vehicle velocity information, information about the RPM of the road wheel detected from the roadwheel brake shaft, and information detected by the vehicle inertia sensor.

In an example, the first slope threshold may be 10 degrees, and if the slope of the vehicle-traveling road is larger than 10 degrees, the steering control device may determine that a slip occurs in the driving shaft of the vehicle.

In an example, the first vehicle velocity threshold may be 20 km/h, and if the vehicle traveling velocity is smaller than 20 km/h, the steering control device may determine that a slip occurs in the driving shaft of the vehicle.

The steering control device 200 of the disclosure may determine the current steering angle of the steering wheel as a reference steering angle when the vehicle is determined to slip (S820). The steering control device may control the driving shaft to allow the road wheel to steer left or right within a first angular range with respect to the reference steering angle (S830).

In an embodiment, the first angular range may be determined based on at least one of the physical information about the vehicle, vehicle velocity information, and information about the slope of the vehicle-traveling road. Here, the vehicle physical information may include such information as the length, width, and driving type (e.g., FF, FR, or 4WD) of the vehicle. Or, the first angular range may be determined by a design value. In an example, the first angular range may be five degrees.

In an embodiment, the steering control device may control the driving shaft to allow the road wheel to steer left or right within a first angular range at a first frequency with respect to the reference steering angle. The first frequency denotes the velocity at which the controller steers the road wheel to the left or right. For example, the first frequency may be set to a pre-stored value or may be determined according to a pre-stored frequency pattern.

Figure 10:
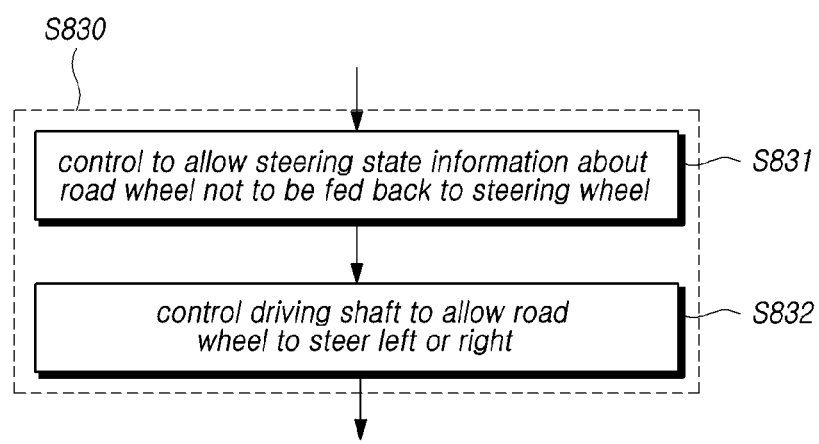
FIG. 10 is a flowchart illustrating an embodiment of controlling a driving shaft in a steering control method of the disclosure.

FIG. 10 is a flowchart illustrating an embodiment of controlling a driving shaft in a steering control method of the disclosure. In an embodiment, if the driving shaft is controlled to allow the road wheel to steer left or right within the first angular range 420 with respect to the reference steering angle 410, the steering control device 120 of the disclosure may control to allow steering state information about the road wheel not to be fed back to the steering wheel.

Since, in the SBW system, an input side (steering column device) including the steering wheel and column and an output side (steering rack device) including the road wheel and rack are not physically connected and are controlled based on signals generated by the electronic control unit, the steering control device 120 may transfer different control signals to the input side and the output side. Accordingly, the steering control device may control the driving shaft to steer the road wheel while controlling to allow the steering control information about the road wheel not to be fed back to the steering wheel. In other words, the steering control device does not transmit a control signal for providing steering force to the steering wheel while steering the road wheel. Hence, since no steering force is provided to the steering wheel, no changes occurs in the steering wheel.

Accordingly, since the steering wheel is not moved even when the steering control device 120 of the disclosure steers the road wheel to the left or right to increase traction, it is possible to increase driving stability without causing the driver or passenger to feel odd.

Figure 11:
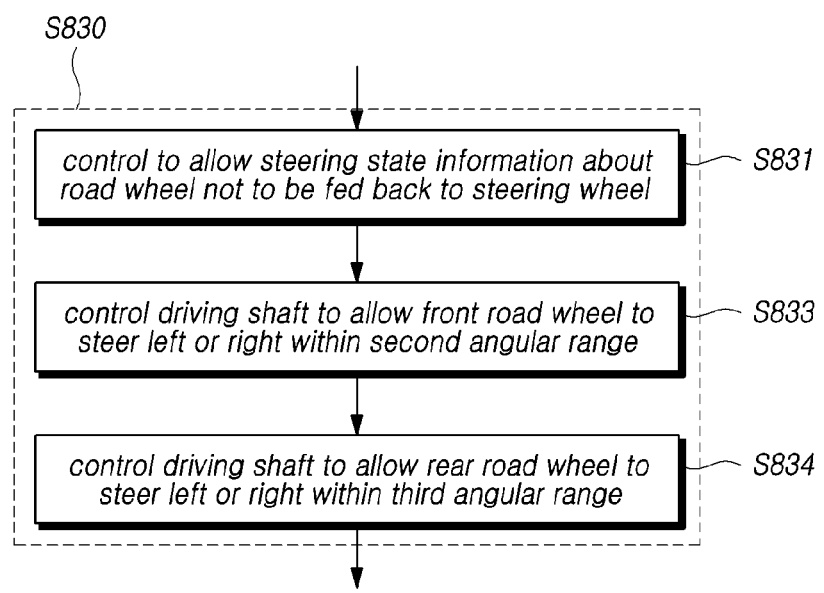
FIG. 11 is a flowchart illustrating another embodiment of controlling a driving shaft in a steering control method of the disclosure.

FIG. 11 is a flowchart illustrating another embodiment of controlling a driving shaft in a steering control method of the disclosure. Road wheels include front road wheels and rear road wheels. In an embodiment, the steering control device 200 may control the driving shaft to allow the front road wheels to steer left or right within a second angular range 510 with respect to the reference steering angle and to allow the rear road wheels to steer left or right within a third angular range 520 with respect to the reference steering angle. In other words, according to an embodiment, the front road wheels and the rear road wheels may be controlled with different setting values.

In an example, the second angular range 510 may be set to be smaller than the third angular range 520. In another example, the second angular range 610 may be set to be larger than the third angular range 620. Or, the ratio of the second angular range to the third angular range may be preset, and the steering control device 200 may determine the second angular range and the third angular range according to the preset ratio. The steering control device 200 may steer the front road wheel and the rear road wheel of the vehicle in different ranges, thus efficiently increasing traction.

Figure 12:
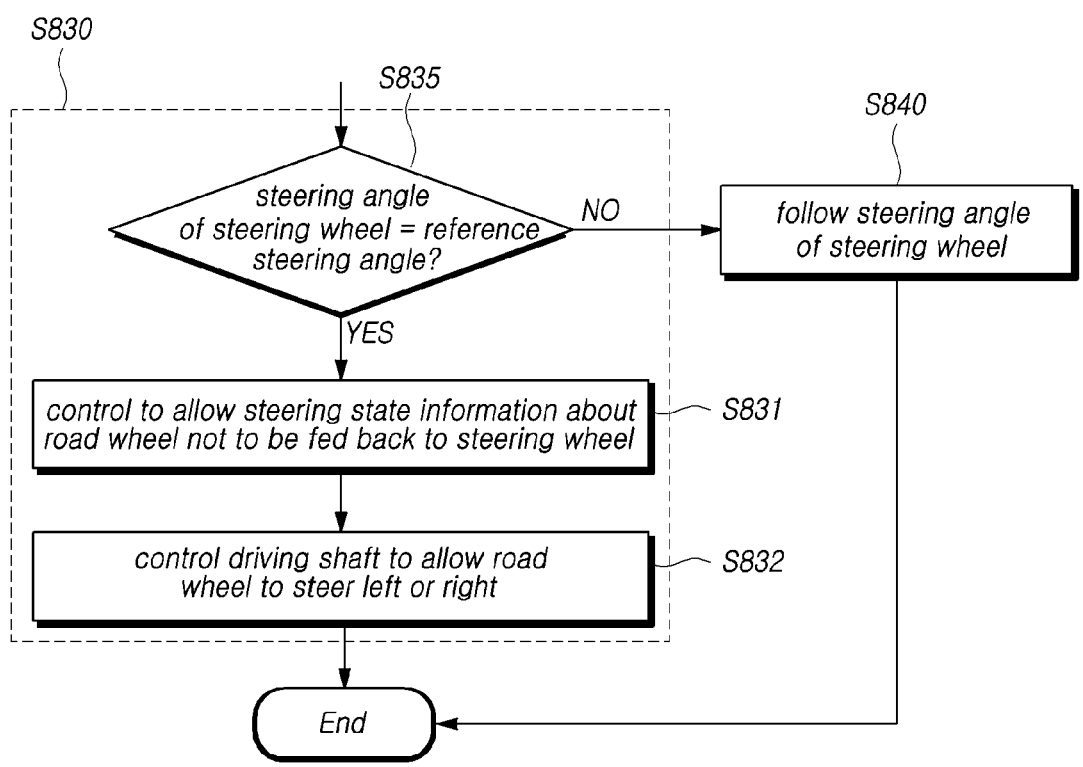
FIG. 12 is a flowchart illustrating a still another embodiment of controlling a driving shaft in a steering control method of the disclosure.

FIG. 12 is a flowchart illustrating a still another embodiment of controlling a driving shaft in a steering control method of the disclosure. In an embodiment, the steering control device 120 may determine whether the steering angle of the steering wheel is identical to the reference steering angle. If the steering angle of the steering wheel is determined not to be identical to the reference steering angle, the steering control device 120 may stop controlling the driving shaft to allow the road wheel to steer left or right within the first angular range and may control to allow the driving shaft to follow the steering angle of the steering wheel.

Specifically, the steering control device 120 may obtain steering angle information about the steering wheel from the steering angle sensor or another ECU or an external device outside the vehicle through the communication unit, e.g., the V2X communication unit, in real-time or periodically. The steering control device 120 may determine that the vehicle slips and determine that the steering angle information about the steering wheel when the vehicle slips is the reference steering angle 710, and then, determine whether the steering angle information about the steering wheel obtained from the sensor is identical to the reference steering angle 710. That the steering angle of the steering wheel is determined not to be identical to the reference steering angle 710 means that the driver has manipulated the steering wheel or the autonomous driving device or system has controlled steering. Thus, it may be determined that the driver or autonomous driving device or system has an intent to steer. Accordingly, if the steering angle of the steering wheel is determined not to be identical to the reference steering angle, the steering control device 200 may stop controlling the driving shaft to allow the road wheel to steer left or right within the first angular range and may control to allow the driving shaft to follow the steering angle of the steering wheel.

By the steering control method of the disclosure, when the vehicle slips, the driving shaft is controlled to allow the road wheels to be steered left or right with respect to the current steering angle of the steering wheel, thereby increasing traction on the low friction road surface, such as a rainy or snowy road, and hence providing stable driving.

Figure 13:
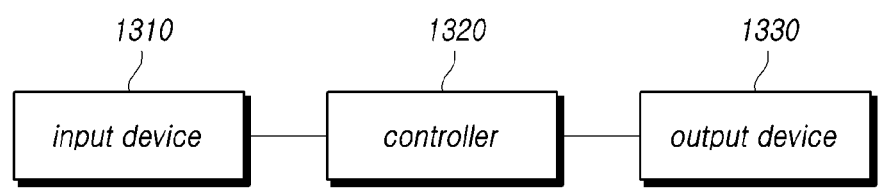
FIG. 13 is a view illustrating a configuration of a steering system according to an embodiment of the disclosure.

FIG. 13 is a view illustrating a configuration of a steering control system 1300 according to an embodiment of the disclosure.

Referring to FIG. 13, the steering control system of the disclosure may include an input device 1310 detecting a steering angle of a steering wheel of a vehicle, an output device 1330 driving a road wheel of the vehicle, and a controller 1320 determining whether the vehicle slips, determining the current steering angle of the steering wheel as a reference steering angle if the vehicle is determined to slip, and controlling a driving shaft to steer the road wheel to the left or right within a first angular range with respect to the reference steering angle.

The input device 1310 may receive a steering control signal for the vehicle from the driver of the vehicle or autonomous driving device or system, and the output device 1330 may control the road wheel of the vehicle according to the steering control signal received from the input device.

Specifically, the input device 1310, i.e., a steering column unit, may include the steering wheel, a steering shaft, a steering angle sensor detecting the steering angle of the steering wheel, a torque sensor detecting the torque of the steering wheel steering shaft, and a reaction force motor providing reaction force torque according to the rotation of the steering wheel. The output device 1330 may include the road wheel, rack, and a steering output sensor capable of detecting the rotation angle of the road wheel, a steering motor generating an assistance force to allow the road wheel to rotate, a steering motor position sensor detecting the position of the rotation shaft of the steering motor, and a rack position sensor detecting the position of the rack.

The controller 1330 may be hardware-wise implemented using at least one of electrical components capable of data processing and performing other functions, such as controllers, micro-controllers, and microprocessors (e.g., computers).

The controller 1330 determines whether the vehicle slips and, if it is determined that the vehicle slips, determines the current steering angle of the steering wheel as the reference steering angle and controls the driving shaft to allow the road wheel to steer left or right within a first angular range with respect to the reference steering angle. The configuration of the controller 1330 may include the configuration of the steering control device of FIG. 2. Accordingly, the description of the controller 1330 of the steering system of the disclosure may reference the description of the steering control device of FIGS. 2 to 7.

Terms, such as "system," "processor," "controller," "component," "module," "interface," "model," and "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may be in a process and/or an execution thread, and the components may be located in one system or may be distributed to two or more systems.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, the disclosure of Korean Patent Application No. 10-2019-0112571 filed on Sep. 11, 2019 is herein incorporated by reference in its entirety. The present patent application claims priority to other applications to be filed in other countries, the disclosures of which are also incorporated by reference herein in their entireties.

The invention claimed is:

1. A steering control device comprising:
   a slip determination unit determining whether a vehicle slips;
   a steering angle determination unit determining a current steering angle of a steering wheel as a reference steering angle if the vehicle is determined to slip; and a controller controlling a driving shaft to allow a road wheel to steer left or right within a first angular range with respect to the reference steering angle, wherein, in a steer-by-wire system in which a steering column device including the steering wheel and a steering column and a steering rack device including the road wheel and a rack are not physically connected, the controller controls to allow steering control information about the road wheel not to be fed back to the steering wheel if the driving shaft is controlled to allow the road wheel to steer left or right within the first angular range with respect to the reference steering angle.

2. The steering control device of claim 1, wherein the first angular range is determined based on at least one of physical information about the vehicle, velocity information about the vehicle, and slope information about a road where the vehicle is traveling.

3. The steering control device of claim 1, wherein the controller controls the driving shaft to allow the road wheel to steer left or right within the first angular range at a first frequency with respect to the reference steering angle.

4. The steering control device of claim 3, wherein the first frequency is set to a pre-stored value or is determined according to a pre-stored frequency pattern.

5. The steering control device of claim 1, wherein the road wheel includes a front road wheel and a rear road wheel, and wherein the controller controls the driving shaft to allow the front road wheel to steer left or right within a second angular range with respect to the reference steering angle and to allow the rear road wheel to steer left or right within a third angular range with respect to the reference steering angle.

6. The steering control device of claim 1, wherein the slip determination unit determines whether the vehicle slips using at least one of whether a slip occurs in the driving shaft of the vehicle, vehicle information about the vehicle, and slope information about a road where the vehicle is traveling.

7. The steering control device of claim 1, wherein the steering angle determination unit determines whether the steering angle of the steering wheel is identical to the reference steering angle, and wherein if the steering angle of the steering wheel is determined not to be identical to the reference steering angle, the controller stops controlling the driving shaft to allow the road wheel to steer left or right within the first angular range with respect to the reference steering angle and controls to allow the driving shaft to follow the steering angle of the steering wheel.

8. A steering control method comprising:
a slip determination step determining whether a vehicle slips;
a steering angle determination step determining a current steering angle of a steering wheel as a reference steering angle if the vehicle is determined to slip; and
a control step controlling a driving shaft to allow a road wheel to steer left or right within a first angular range with respect to the reference steering angle,
wherein, in a steer-by-wire system in which a steering column device including the steering wheel and a steering column and a steering rack device including the road wheel and a rack are not physically connected, the control step controls to allow steering control information about the road wheel not to be fed back to the steering wheel when the driving shaft is controlled to allow the road wheel to steer left or right within the first angular range with respect to the reference steering angle.

9. The steering control method of claim 8, wherein the first angular range is determined based on at least one of physical information about the vehicle, velocity information about the vehicle, and slope information about a road where the vehicle is traveling.

10. The steering control method of claim 8, wherein the control step controls the driving shaft to allow the road wheel to steer left or right within the first angular range at a first frequency with respect to the reference steering angle.

11. The steering control method of claim 8, wherein the road wheel includes a front road wheel and a rear road wheel, and wherein the control step controls the driving shaft to allow the front road wheel to steer left or right within a second angular range with respect to the reference steering angle and to allow the rear road wheel to steer left or right within a third angular range with respect to the reference steering angle.

12. The steering control method of claim 8, wherein the steering angle determination step determines whether the steering angle of the steering wheel is identical to the reference steering angle, and wherein if the steering angle of the steering wheel is determined not to be identical to the reference steering angle, the control step stops controlling the driving shaft to allow the road wheel to steer left or right within the first angular range with respect to the reference steering angle and controls to allow the driving shaft to follow the steering angle of the steering wheel.

13. A steering system comprising:
an input device detecting a steering angle of a steering wheel of a vehicle;
an output device driving a road wheel of the vehicle; and
a controller determining whether the vehicle slips and, if the vehicle is determined to slip, determining a current steering angle of the steering wheel as a reference steering angle and controlling a driving shaft to allow the road wheel to steer left or right within a first angular range with respect to the reference steering angle,
wherein the steering system is a steer-by-wire system in which a steering column device as the input device including the steering wheel and a steering column and a steering rack device as the output device including the road wheel and a rack are not physically connected, and
wherein the controller controls to allow steering control information about the road wheel not to be fed back to the input device if the driving shaft is controlled to allow the road wheel to steer left or right within the first angular range with respect to the reference steering angle.

* * * * *